J. W. SANDERS.
WHEEL.
APPLICATION FILED APR. 2, 1912.

1,035,748.

Patented Aug. 13, 1912.

Witnesses

John W. Sanders,
Inventor by

Attorneys

UNITED STATES PATENT OFFICE.

JOHN WALTER SANDERS, OF EL DORADO, ARKANSAS.

WHEEL.

1,035,748.

Specification of Letters Patent. Patented Aug. 13, 1912.

Application filed April 2, 1912. Serial No. 688,089.

*To all whom it may concern:*

Be it known that I, JOHN WALTER SANDERS, a citizen of the United States, residing at El Dorado, in the county of Union and State of Arkansas, have invented a new and useful Wheel, of which the following is a specification.

The object of the present invention is to provide a convenient, economical and efficient means whereby gear rims may be attached to the driving wheels of gear-operated locomotives, to prevent a shearing of the bolts whereby the gear rims are attached to the wheels.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 1:
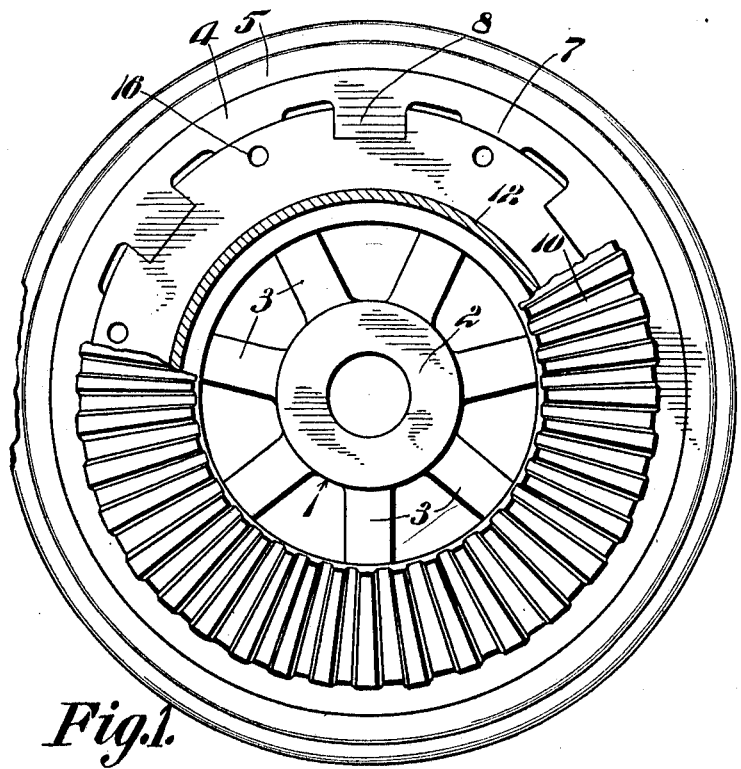
Figure 2:
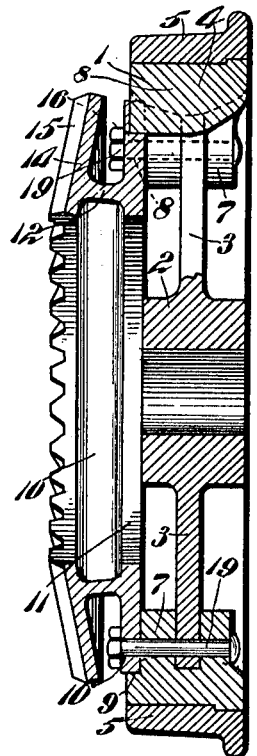
Figure 3:
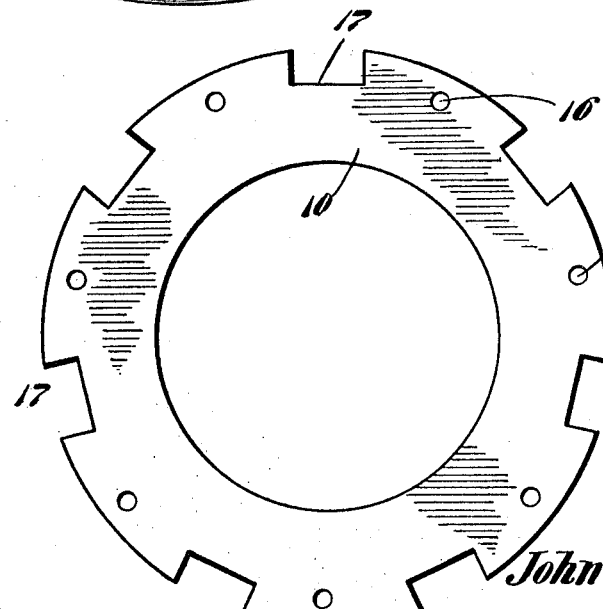

In the drawings,—Figure 1 shows in elevation, a wheel constructed in accordance with the present invention, parts being broken away; Fig. 2 shows in transverse section, a wheel constructed in accordance with the present invention; and Fig. 3 is an elevation of the gear rim.

The wheel is denoted generally by the numeral 1, and may be variously fashioned. In the present instance it comprises a hub 2, from which radiate spokes 3 carrying a rim 4. The rim 4 may be surrounded by a tire 5, the rim 4 being shouldered as shown at 6 to interengage with a seat or recess in the inner face of the tire 5, whereby the tire will be held against lateral movement upon the rim. The inner face of the rim 4 is equipped with a series of primary lugs 7, and between the lugs 7, secondary lugs 8 are positioned. There may be any number of the lugs 7 and 8. In the lugs 7, recesses 9 are provided, at one side of the wheel.

The invention further includes a gear rim, denoted generally by the numeral 10. The gear rim 10 comprises a flange 11, adapted to fit in the recesses 9, there being a neck 12 projecting from the flange 11, the neck 12 carrying a plate 14, equipped with gear teeth 15. There are openings 16 in the flange 11, these openings 16 being adapted to be alined with openings in the primary lugs 7. In the periphery of the flange 11 recesses 17 are fashioned, the secondary lugs 8 being adapted to fit closely in the recesses 17. Securing elements, denoted by the numeral 19, and preferably taking the form of bolt and nut structures, are inserted through the openings in the primary lugs 7, and through the openings 16 in the flange 11, whereby the gear rim 10 may be held against the lugs 7. Owing to the fact that the lugs 8 register in the recesses 17, the strain incident to the driving of the wheel will be received by the lugs 8, thereby preventing a shearing of the securing elements 19, these elements 19 being employed merely for the purpose of maintaining the gear rim 10 upon the wheel, so that the secondary lugs 8 will engage with the recesses 17 in the flange 11 of the gear rim.

From the foregoing it will be seen that a driving force of great magnitude may be applied to the wheel, through the instrumentality of the gear rim 10, without endangering a separation of the gear rim from the wheel, due to a shearing of the securing bolts 19, the entire strain incident to the driving of the wheel being received by the lugs 8 which are fashioned integrally with the wheel proper.

Having thus described the invention, what is claimed is:—

1. In a device of the class described, a wheel including a rim provided in its under face with primary and secondary lugs projecting toward the axis of the rim; a gear rim having recesses in which the primary lugs are adapted to fit, the secondary lugs constituting means for preventing the gear rim from moving transversely of the wheel; and securing elements extended through the gear rim and through the secondary lugs.

2. A wheel comprising a rim, there being primary and secondary lugs projecting toward the axis of the wheel from the under surface of the rim; a gear rim including a flange having openings adapted to receive the primary lugs to prevent independent rotation between the gear rim and the wheel, there being recesses in the side faces of the secondary lugs, in which recesses the flange of the gear rim is adapted to fit, to prevent the gear rim from moving transversely of the wheel; and securing elements extended through the flange of the gear rim and through the secondary lugs.

In testimony that I claim the foregoing as my own, I have hereto affixed my signature in the presence of two witnesses.

JOHN WALTER SANDERS.

Witnesses:
B. H. PONDER,
W. W. DURDEN.